US008365282B2

(12) United States Patent
Martin et al.

(10) Patent No.: US 8,365,282 B2
(45) Date of Patent: Jan. 29, 2013

(54) SECURITY SYSTEM BASED ON INPUT SHORTCUTS FOR A COMPUTER DEVICE

(75) Inventors: Daryl Martin, Paradise (CA); Ahmed Hassan, Waterloo (CA); J. F. Sean Wilson, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 872 days.

(21) Appl. No.: 11/779,372

(22) Filed: Jul. 18, 2007

(65) Prior Publication Data

US 2009/0025089 A1 Jan. 22, 2009

(51) Int. Cl.
G06F 21/00 (2006.01)
(52) U.S. Cl. .............. 726/23; 726/17; 726/22; 726/28
(58) Field of Classification Search .............. 726/17, 726/26, 28
See application file for complete search history.

(56) References Cited

U.S. PATENT DOCUMENTS

| | | | |
|---|---|---|---|
| 6,114,978 A | 9/2000 | Hoag | |
| 6,134,657 A | 10/2000 | Johnson et al. | |
| 6,134,863 A * | 10/2000 | Knox | 53/432 |
| 6,405,318 B1 * | 6/2002 | Rowland | 726/22 |
| 6,779,119 B1 | 8/2004 | Moshfeghi et al. | |
| 7,730,540 B1 * | 6/2010 | Woirhaye et al. | 726/26 |
| 2002/0115476 A1 | 8/2002 | Padawer et al. | |
| 2002/0171546 A1 * | 11/2002 | Evans et al. | 340/540 |
| 2003/0191594 A1 | 10/2003 | Kondo et al. | |
| 2003/0191595 A1 * | 10/2003 | Bell | 702/81 |
| 2004/0068559 A1 * | 4/2004 | Shaw | 709/224 |
| 2004/0139353 A1 | 7/2004 | Forcade | |
| 2005/0020315 A1 | 1/2005 | Robertson | |

FOREIGN PATENT DOCUMENTS

| | | |
|---|---|---|
| CA | 2637972 | 1/2009 |
| EP | 1592194 | 11/2005 |
| EP | 2017759 | 1/2009 |

OTHER PUBLICATIONS

Email client. (2006). In High Definition: A-Z Guide to Personal Technology.*
European Patent Office Action dated Feb. 3, 2011 for corresponding EP Application No. 07112672.6.
Office Action dated Apr. 11, 2011 for the corresponding Canadian Patent Application 2,637,972.
Search Report. European Patent Application No. 07112672.6. Dated: Nov. 20, 2007.
Response. European Patent Application No. 07112672.6. Dated: Jul. 21, 2009.

(Continued)

Primary Examiner — Kambiz Zand
Assistant Examiner — Imhotep Durham
(74) Attorney, Agent, or Firm — Bereskin & Parr LLP/S.E.N.C.R.L., s.r.l.

(57) ABSTRACT

A method of activating security functions on a computer device, for example a mobile communications device. The computer device includes a device state that may be realized by way of a first user input or a second user input. The method includes designating the first user input to realize the device state as a security rule having an associated security function, detecting realization of the device state, and activating the associated security function if the device state was realized by way of the second user input rather than the first user input. For example, the first user input may be a shortcut input, and the second user input may be a conventional or normal input.

24 Claims, 7 Drawing Sheets

OTHER PUBLICATIONS

Exam Report. European Patent Application No. 07112672.6. Dated: Feb. 16, 2010.
Response. European Patent Application No. 07112672.6. Dated: Jun. 16, 2010.
Response. European Patent Application No. 07112672.6. Dated: Aug. 12, 2011.
Office Action dated Feb. 17, 2012 for corresponding Canadian Patent Application No. 2,637,972.

* cited by examiner

SECURITY SYSTEM BASED ON INPUT SHORTCUTS FOR A COMPUTER DEVICE

FIELD

Example embodiments described herein relate to computer devices and, in particular, to security of information on such devices.

BACKGROUND

Computer devices, in particular handheld mobile communications devices, typically contain personal, corporate, or other secure information of the user. Such computer devices allow a user to store and manipulate such information as needed. If the computer device acts as a communications device, such devices would allow a user to be in contact through a communications network, for example the Internet, through various applications such as email and web browsing.

In some instances, an unscrupulous or other unauthorized individual may come to access the device, for example when the device is lost or unattended by the intended user. If the device is a handheld device, it may be readily lost or stolen, and the secure information stored therein may be immediately accessible. If the device is a communications device, information remotely accessible from the device may also be accessed, for example corporate information contained on a corporate server.

One means of addressing this difficulty is to apply a security password to the device. Only users who enter the correct security password into the device would have access to the device. A difficulty with this is that the security password would have to be activated by the user, for example by turning on the security password feature or by some triggering event, for example by holstering of a handheld device. In some devices, the security password feature may also be activated after a predefined duration of inactivity of the device.

However, the above-described devices require active triggering events to be performed by the user or a passage of a predetermined duration of time. An unscrupulous or other individual may only require moments to access the secure information, possibly well before any of these security features are activated.

SUMMARY

In one aspect, the present application provides a method of activating security functions on a computer device where the computer device is configured for being locked and unlocked. The computer device has a device state that may be realized by way of a first user input or a second user input. The method designates a security function associated with the a security rule (the security rule including detecting realization of the device state by way of the second user input instead of the first user input), then detects realization of the device state, and finally activates the associated security function if the device state was realized by way of the second user input instead of the first user input.

In another aspect, the present application provides a computer device that comprises a controller for controlling the operation of the device, a user input interface for inputting information to the controller, a display coupled to the controller, a software module executable by the controller and configured to produce a device state that may be realized by way of a first user input or a second user input received while the computer device is unlocked, and a security module executable by the controller for locking and unlocking of the computer device. The security module is configured to designate a security function associated with a security rule (the security rule including detecting realization of the device state by way of the second user input instead of the first user input), detect realization of the device state, and activate the associated security function if the device state was realized by way of the second user input instead of the first user input.

In yet another embodiment, the present application provides a computer program product having a machine-readable non-transitory storage medium having encoded thereon computer-executable instructions for activating security functions on a computer device. The computer device is configured for being locked and unlocked, and the computer device having a device state that may be realized by way of a first user input or a second user input being received while the computer device is unlocked. The computer-executable instructions have instructions for designating a security function associated with a security rule (the security rule including realization of the device state by way of the second user input instead of the first user input), instructions for detecting realization of the device state, and instructions for activating the associated security function if the device state was realized by way of the second user input instead of the first user input.

BRIEF DESCRIPTION OF THE DRAWINGS

Example embodiments will now be described by way of example with reference to the accompanying drawings, through which like reference numerals are used to indicate similar features.

DETAILED DESCRIPTION

Figure 1:
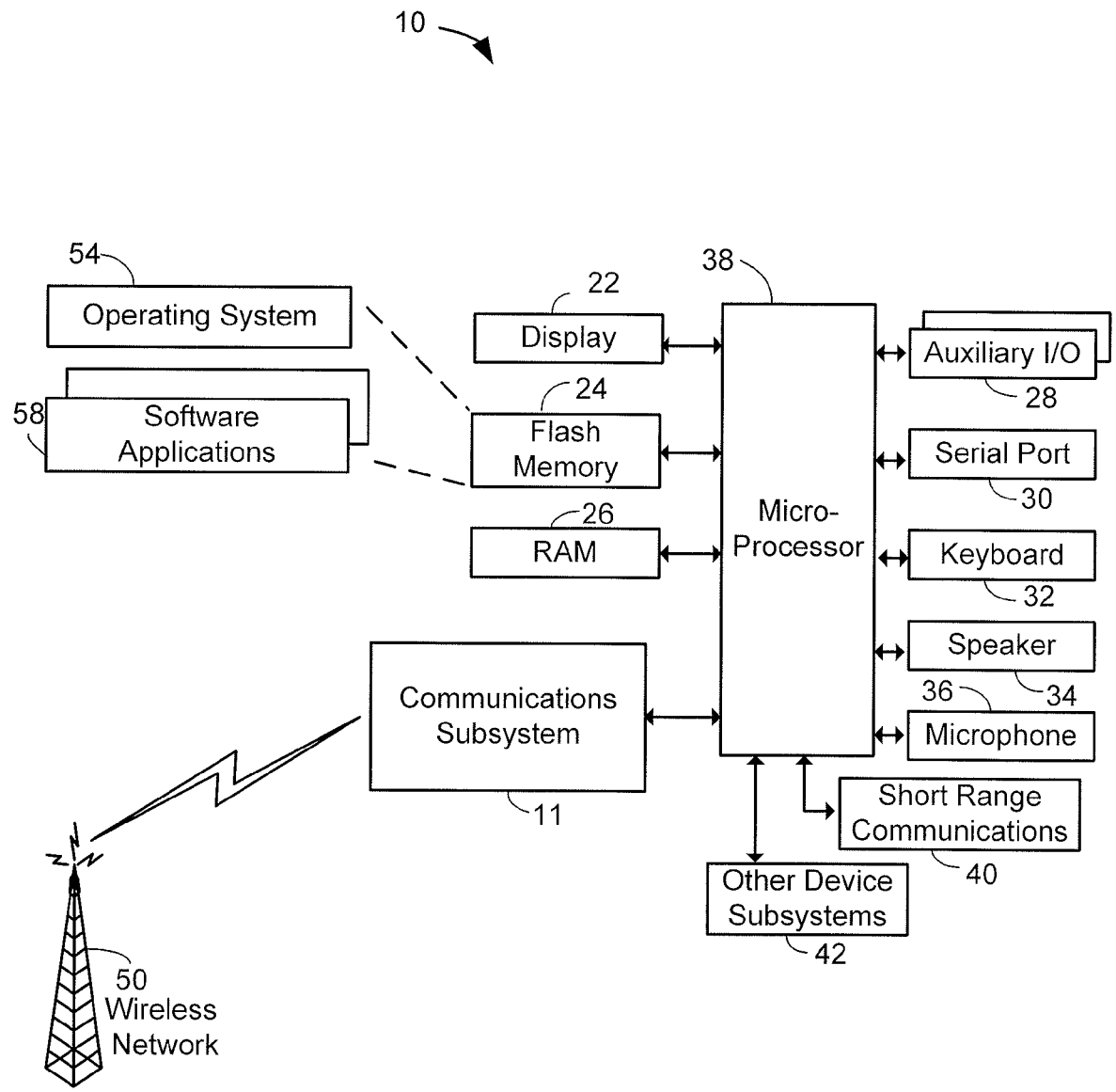
FIG. 1 shows a block diagram of an example of a mobile communications device to which example embodiments can be applied.

In one aspect, the present application provides a method of activating security functions on a computer device, the computer device having a device state that may be realized by way of a first user input or a second user input. The method includes steps of defining a security rule, wherein the security rule comprises realization of the device state by way of the first user input; designating a security function associated with the security rule; detecting realization of the device state; and if the device state was realized by way of the second user input instead of the first user input, then activating the associated security function.

In another aspect, the present application provides a computer device. The computer device includes a controller for controlling the operation of the device; a user input interface for inputting information to the controller; a display coupled to the controller; a software module executable by the controller and configured to produce a device state that may be realized by way of a first user input or a second user input; and a security module executable by the controller. The security module is configured to define a security rule, wherein the security rule comprises realization of the device state by way of the first user input, designate a security function associated with the security rule, detect realization of the device state, and if the device state was realized by way of the second user input instead of the first user input, then activate the associated security function.

In yet another embodiment, the present application provides a computer program product comprising a machine-readable medium having encoded thereon computer-executable instructions for activating security functions on a computer device. The computer device has a device state that may be realized by way of a first user input or a second user input. The computer-executable instructions include instructions for defining a security rule, wherein the security rule comprises realization of the device state by way of the first user input; instructions for designating a security function associated with the security rule; instructions for detecting realization of the device state; and instructions for activating the associated security function if the device state was realized by way of the second user input instead of the first user input.

The following description of one or more specific embodiments does not limit the implementation of the invention to any particular computer programming language, operating system, system architecture or device architecture. Moreover, although some embodiments may include mobile devices, not all embodiments are limited to mobile devices; rather, various embodiments may be implemented within a variety of computer devices or terminals, including handheld devices, mobile telephones, personal digital assistants (PDAs), personal computers, audio-visual terminals, televisions, and other devices.

For clarity, reference to "input shortcuts", "keyboard shortcuts", or "shortcuts" includes an input or set of inputs that perform a predefined device function on a computer device in a particular context. These device functions can often be done via some other, more conventional or indirect mechanism, such as using a menu, typing a longer command, scrolling, and/or using a pointing device. By reducing such mechanisms to a few user inputs, a user may possibly save time and energy. Some keyboard shortcuts require keys (or sets of keys) to be pressed individually, in sequence. Other shortcuts require keys to be pressed simultaneously, for example by pressing down a modifier key and then depressing another key. Typical examples of such modifier keys are SHIFT, ALT, CTRL, etc.

References herein to a device function are intended to be specific to a context and to refer to a device operation triggered by a user input that brings about a certain device state as a result of the user input. For example, in the context of composing an email, a "device state" may be considered the state in which the composition window is active and contains the word "your". The input that brings about that device state may include typing the word "your" in the conventional manner using the keyboard. It may alternatively include using a shortcut, such as typing "ur" which the application is configured to automatically translate to "your". Another possibility is to cut-and-paste the word "your" from another document into the composition window. All these inputs cause context-specific device functions or operations that realize the device state of an active email composition window containing the word "your".

Referring now to the drawings, FIG. 1 is a block diagram showing an example of an electronic communications device 10 to which example embodiments described herein can be applied. The communications device 10 is a two-way mobile communication device having voice and messaging communications capabilities. Depending on the functionality provided by the device 10, in various embodiments the device 10 may be a data communication device, a multiple-mode communication device configured for both data and voice communication, a mobile telephone, a PDA enabled for wireless communication, a computer system with a wireless modem or wireless network card, or a computer or phone device with a fixed connection to a network, among other things. The device 10 is in at least one example embodiment a handheld device having a casing that is dimensioned to fit into a purse, pocket or belt-mounted device holster.

In the example embodiment shown in FIG. 1, the device 10 includes a communication subsystem 11 acting as the interface between the device 10 and a wireless communications network 50. The communication subsystem 11 may include one or more receivers, transmitters, and associated components such as one or more antenna elements, and a processing module such as a digital signal processor (DSP). As will be apparent to those skilled in the field of communications, the particular design of the communication subsystem 11 will be dependent upon the communication network(s) in which the device 10 is intended to operate.

The device 10 includes a controller that includes at least one microprocessor 38 that controls the overall operation of the device. The microprocessor 38 interacts with the communications subsystem 11 and also interacts with further device subsystems such as a display 22, flash memory 24, random access memory (RAM) 26, one or more auxiliary input/output (I/O) subsystems or devices 28 (e.g. a scrollwheel 28a, trackball or scrollball), serial port 30, keyboard or keypad 32, speaker 34, microphone 36, a short-range communications subsystem 40, and any other device subsystems generally designated as 42.

Figure 2:
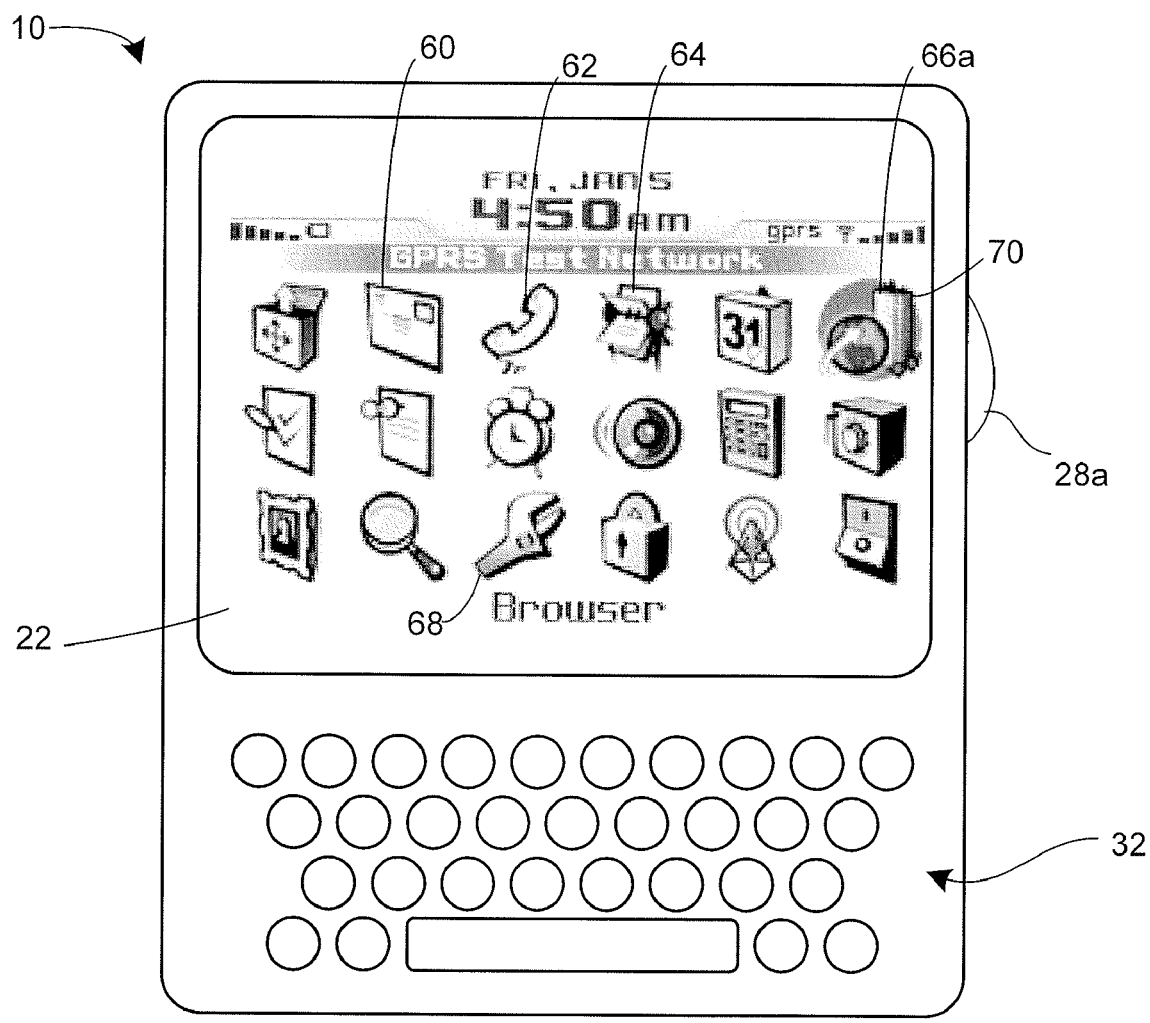
FIG. 2 shows, in diagrammatic form, a front view of an example of the device of FIG. 1.

FIG. 2 shows, in diagrammatic form, a front view of an example handheld embodiment of the device 10 of FIG. 1. The device 10 includes a display screen 22, alphanumeric keyboard or keypad 32 and a rotatable input device such as a trackball or scrollwheel 28a. In some embodiments the keys in keyboard 32 may not be actual physical keys but may be virtual keys displayed on a touch screen display.

Referring again to FIG. 1, operating system software 54 and various software applications 58 used by the microprocessor 38 are, in one example embodiment, stored in a persistent store such as flash memory 24 or similar storage element. Those skilled in the art will appreciate that the operating system 54, software applications 58, or parts thereof, may be temporarily loaded into a volatile store such as RAM 26. It is contemplated that received communication signals may also be stored to RAM 26.

The microprocessor 38, in addition to its operating system functions, in example embodiments enables execution of software applications 58 on the device. A predetermined set of software applications 58 which control basic device operations, including data and voice communication applications for example, will normally be installed on the device 10 during manufacture. Further software applications 58 may also be loaded onto the device 10 through the wireless communication network 50, an auxiliary I/O subsystem 28, serial port 30, short-range communications subsystem 40 or any other suitable subsystem 42, and installed by a user in the RAM 26 or a non-volatile store for execution by the microprocessor 38. Such flexibility in application installation increases the functionality of the device and may provide enhanced on-device functions, communication-related functions, or both. For example, secure communication applications may enable electronic commerce functions and other such financial transactions to be performed using the device 10.

In a data communication mode, a received signal such as a text message or web page download will be processed by the communication subsystem 11 and input to the microprocessor 38, which further process the received signal for output to the display 22 through a graphics subsystem 44, or alternatively to an auxiliary I/O device 28. A user of device 10 may also compose data items within a software application 58, such as email messages, using the keyboard 32 in conjunction with the display 22 and possibly an auxiliary I/O device 28 (e.g. the scrollwheel 28a). Such composed items may then be transmitted and received over a communication network through the communication subsystem 11.

The serial port 30 (which may be for example a universal serial bus (USB) port) in FIG. 1 may enable a user to set preferences through an external device or software application and would extend the capabilities of the device 10 by providing for information or software downloads to the device 10 other than through a wireless communication network.

The short-range communications subsystem 40 is a further component which may provide for communication between the device 10 and different systems or devices, which need not necessarily be similar devices. For example, the subsystem 40 may include an infrared device and associated circuits and components or a Bluetooth™ communication module to provide for communication with similarly enabled systems and devices.

Wireless communication network 50 is, in an example embodiment, a wireless wide area packet data network, which provides radio coverage to mobile devices 10. Wireless communication network 50 may also be a voice and data network such as GSM (Global System for Mobile Communication) and GPRS (General Packet Radio System), CDMA (Code Division Multiple Access), or various other third generation networks such as EDGE (Enhanced Data rates for GSM Evolution) or UMTS (Universal Mobile Telecommunications Systems). In some example embodiments, network 50 is a wireless local area network (WLAN), such as for example a network compliant with one or more of the IEEE 802.11 family of standards. In some example embodiments, the device 10 is configured to communicate in both data and voice modes over both wireless WAN and WLAN networks and to roam between such networks.

Figure 3:
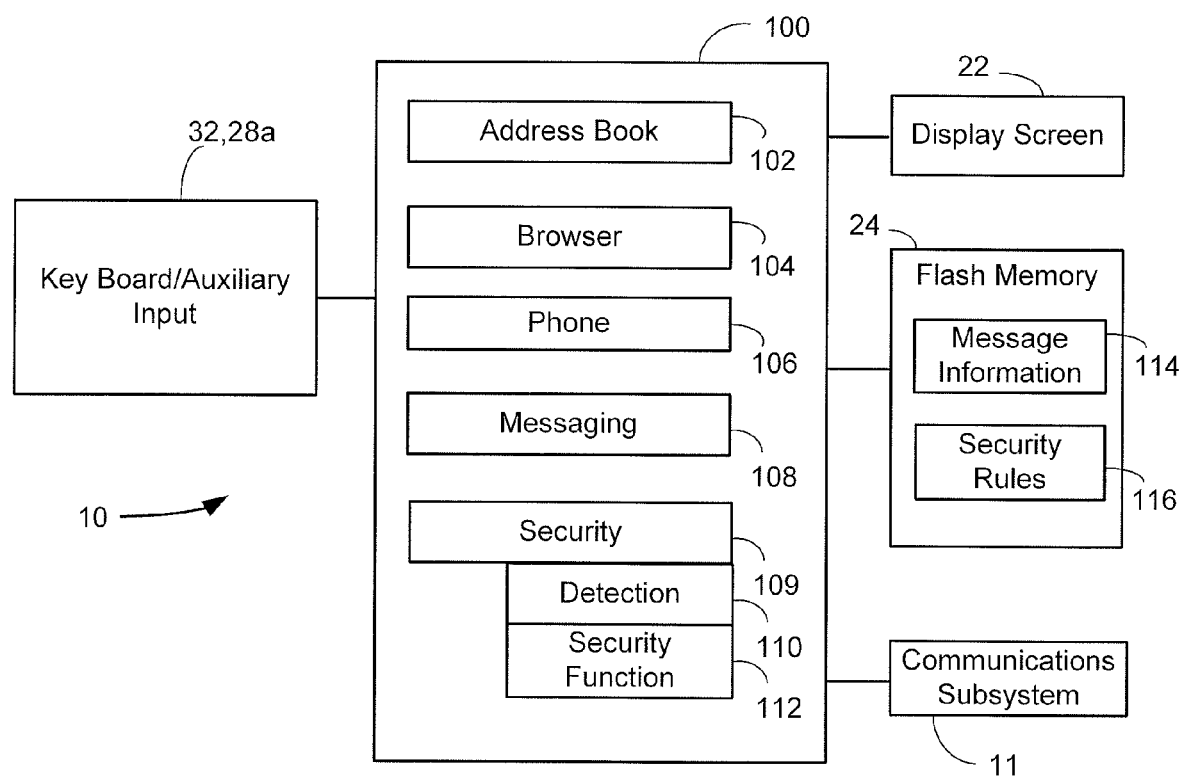
FIG. 3 shows a further operational block diagram representation of the mobile communications device of FIG. 1.

FIG. 3 shows a further operational block diagram representation of the mobile communications device 10 of FIG. 1. Also stored in a persistent storage of the device 10 (such as flash memory 24) is message information 114 and security rule information 116. Such information may also be at least partially stored at least some of the time in memory of a SIM card used with the device, in volatile device memory, and/or at a location accessible to the device 10 over the network 50.

Under instructions from various software applications 58 resident on the device 10, the processor 38 is configured to implement various functional components or modules 100, some of which are represented in FIG. 3, for interacting with the device subsystems described above. In an example embodiment, the software resident on the device 10 includes applications for implementing an address book 102, a web browser 104, a telephone 106, electronic messaging 108, and security 109. In some embodiments, some or part of the functionality of the functional modules 100 can be implemented through firmware or hardware components instead of, or in combination with, computer software instructions executed by the microprocessor 38 (or other processors).

The electronic messaging module 108 enables the device 10 to send and receive messages, such as email messages, over one or more wireless networks 50. Messages may be stored as message information 114. Examples of electronic messaging include email, personal identification number (PIN) and/or short message service (SMS).

The address book 102 enables address book information, such as telephone numbers, PIN numbers, and email and/or itext-messaging addresses, to be stored and accessed on the device 10. The browser module 104 permits a user to access a specified web address, for example via data transfer over one or more wireless networks 50. The telephone module 106 enables the device 10 to transmit and receive voice and data over one or more wireless networks 50.

The security module 109 generally grants access to the device 10, and can also deny access to the device 10. The security module 109 may include a security password for access to the device. The security module may also include a detection module 110 and a security function module 112. In some example embodiments, the detection module 110 determines whether a conventional or normal user input was entered into the device instead of an input shortcut, and the security function module 112 performs a security function, for example locking of the device 10. Other features and functions of the security module 109 are outlined in greater detail below.

Reference is again made to FIG. 2, which shows, in diagrammatic form, an example embodiment of the electronic communications device 10 on which a plurality of user selectable icons are shown on the display 22. The icons are each associated with functions that can be performed by the device 10. For example, FIG. 2 shows a "Messages" icon 60 for accessing electronic messaging functions of the device (associated with electronic messaging module 108), a "Phone" icon 62 for accessing phone functionality (associated with telephone module 106), and an "Address Book" icon 64 for accessing address book functions (associated with address book module 102), a browser icon 66a for accessing web browsing functions (associated with browser module 104), and an options icon 68 (associated with an options module, which may be a separate module or executed by one or more existing modules 100). The options icon 68 may also be used to activate an options user-interface screen, as will be described below in connection with FIG. 4. As shown, the browser icon 66a is highlighted or focused by a caret or selection symbol 70 which can be navigated by a device user among the displayed icons through rotation of the scrollwheel 28a (or other navigational input device). The scrollwheel 28a is also depressible, such that depression of the scrollwheel 28a when an icon is highlighted or focused by selection symbol 70 results in launching of the underlying function.

Generally, all device functions of the device 10 have a corresponding conventional or normal user input to perform the device function in a given context to bring about a certain device state. Some device functions may also be performed by an alternative input, for example an input shortcut. For example, navigation functions can be accomplished in some contexts by using a shortcut key instead of scrolling to the desired function (e.g., using a cursor key or scrollwheel 28a). Generally, according to example embodiments, the device 10 is configured to associate one or more shortcuts with a corresponding security function. The device 10 is configured to detect or determine whether an input other than the input shortcut has been entered into the device 10 to perform the device function, i.e. to realize the device state. If so, the input is deemed by the device 10 to be a security violation or breach of a security rule, and the device may implement or activate the security function on the device 10. For example, if an unauthorized user gains access to the device 10, the device 10 would appear to the unauthorized user to be fully accessible. However, if the unauthorized user inputs a conventional or normal user input to realize a device state, rather than a preconfigured shortcut, this would activate the appropriate security function on the device 10.

Figure 4:
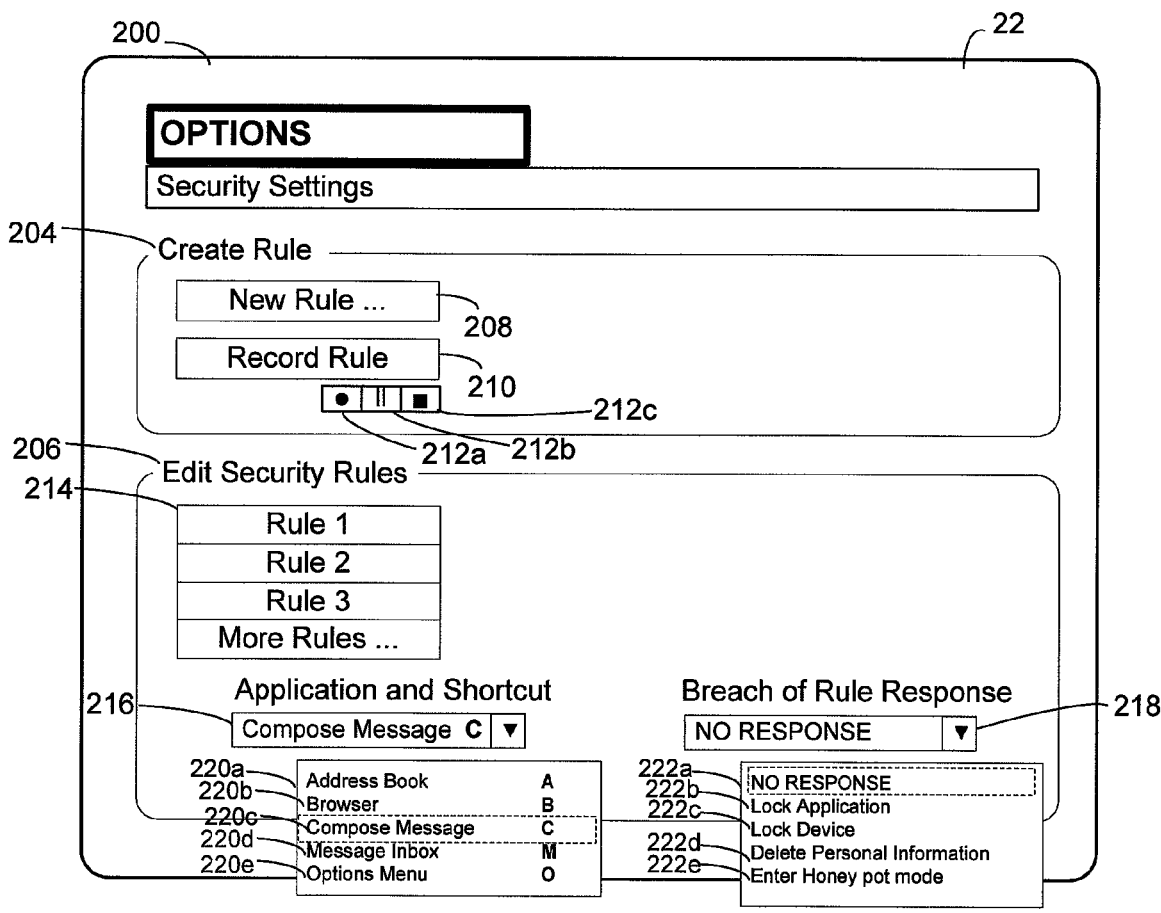
FIG. 4 shows an example of an options user-interface screen shown on a display of the device of FIG. 1.
Figure 9:
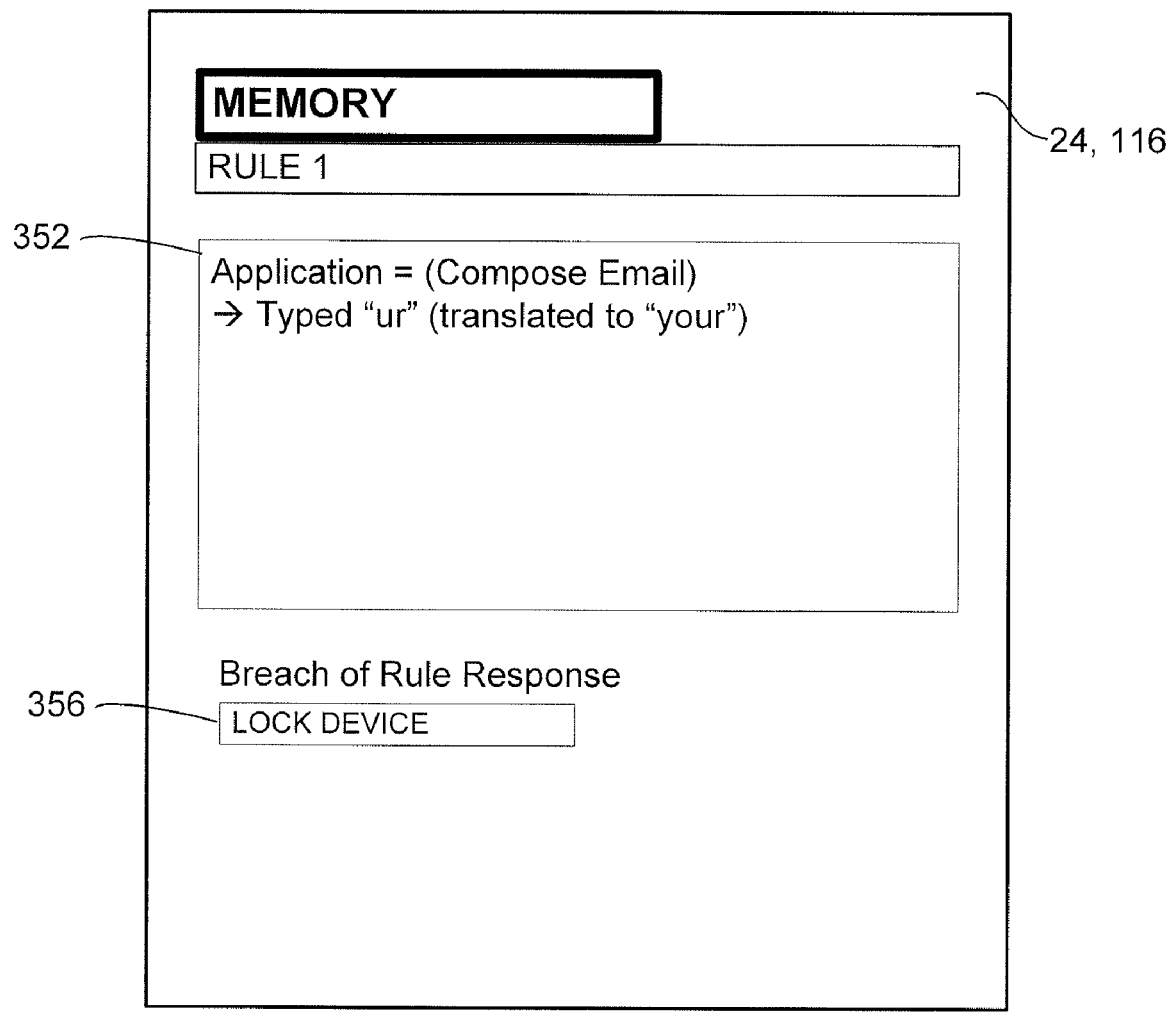
FIG. 9 shows an example of a data object used by a controller of the mobile communications device of FIG. 1.

To accomplish such embodiments, the security rule information 116 in flash memory 24 may be configured to contain a data structure as best illustrated in FIGS. 4 and 9. FIG. 4 illustrates the security rule information 116 as displayed on an example options user-interface screen 200 shown on the display 22 of the device 10. FIG. 9 represents a security rule, illustrated with respect to Security Rule 1, as stored in memory such as flash memory 24. Turning again to FIG. 4, with reference to the Edit Security Rules menu 206, the security rule information 116 may be configured to include a number of security rules 214, illustrated as Rule 1 Rule 2, Rule 3, etc. The information contained in each of the security rules 214 may be based on free text, code, and/or pseudo code for implementation of the respective security rule 214. In addition, the Edit Security Rules menu 206 may also contain preconfigured and configurable options, illustrated in an application and shortcut dropdown menu 216 and a breach of rule response dropdown menu 218. Accordingly, predetermined security functions can be implemented. By way of example, referring again to FIG. 9, the security rule 116 stored in memory 24 shows in text format Security Rule 1 in text window 352. In some example embodiments, as indicated in text window 352, the Security Rule 1 is written in code or pseudo-code that the rule applies to an email application. Also shown in text window 352, Security Rule 1 states that when the user types in "ur" as a shortcut to typing in "your", the user has complied with the Security Rule 1. However, if the user types in "your" instead of the indicated shortcut "ur", the device 10 determines that the device function has been activated by the conventional input rather than the shortcut key, and performs a predetermined security function, in this case locking the device, as indicated by the lock device instruction 356 as stored in flash memory 24. It will be appreciated that the rule and its detection may include input of a <space> character or other punctuation character before and after typing "ur" or "your" so as to indicate the beginning and end of the input. Such a condition would eliminate false positive detection of "your" from input like "yourself" or detection of "ur" from the end of typing "your".

Figure 5:
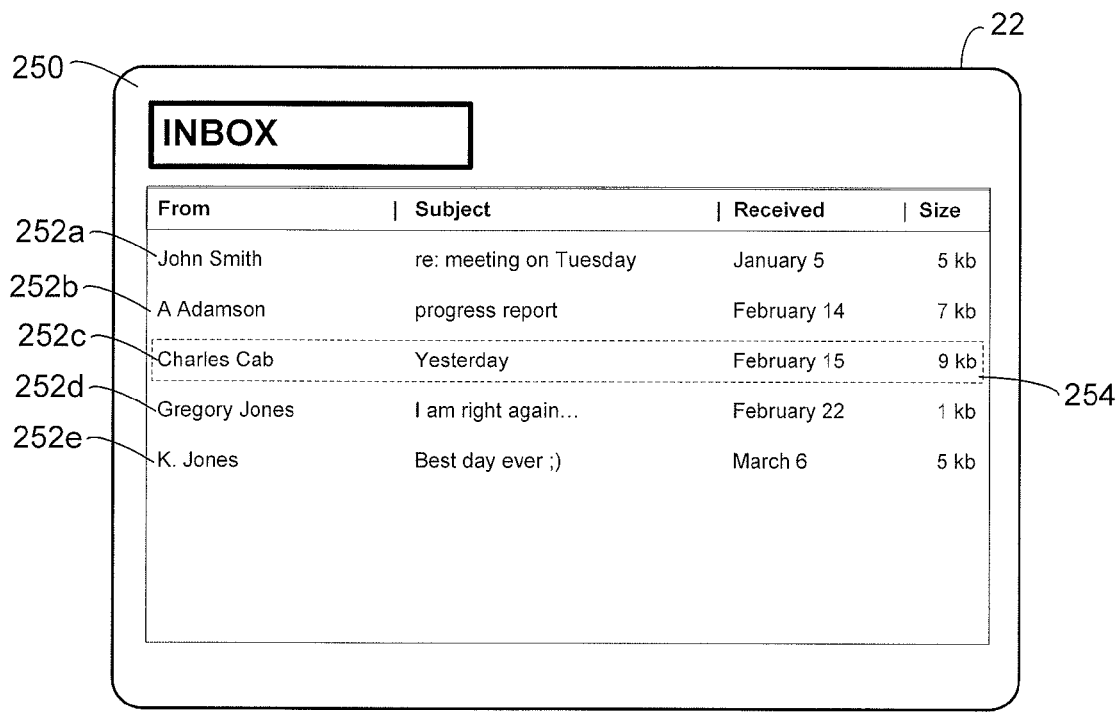
FIG. 5 shows an example of a message user-interface screen shown on a display of the device.
Figure 6:
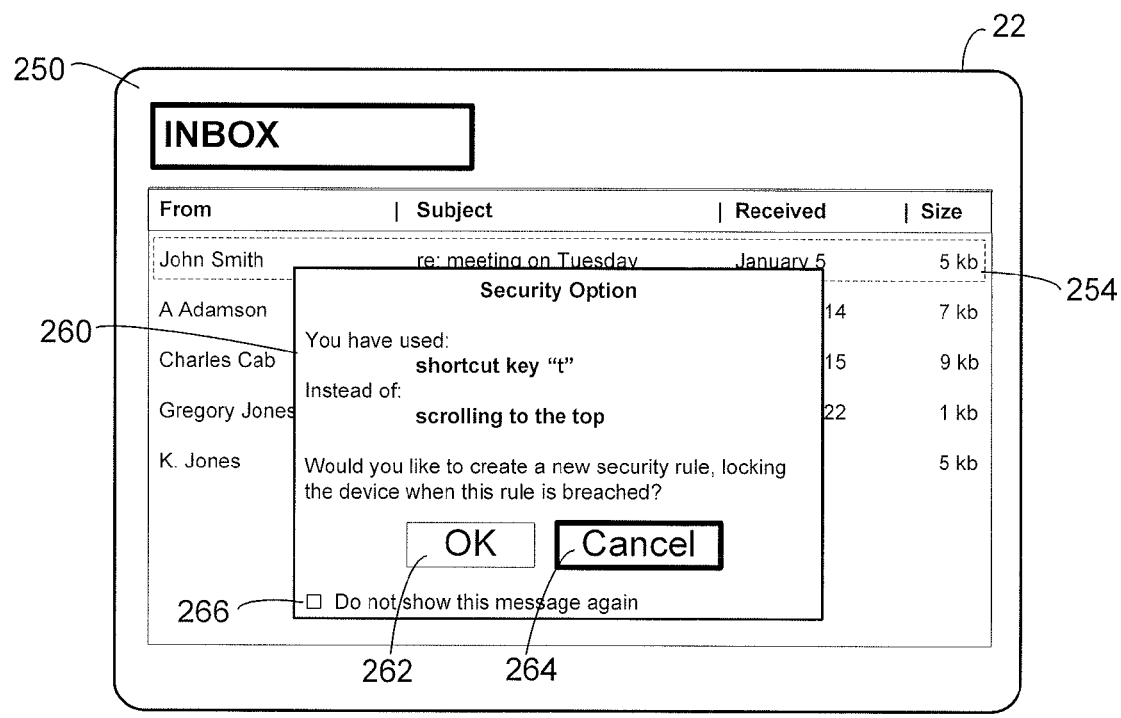
FIG. 6 shows the message user-interface screen with an additional security option popup window.

Reference is now made to FIGS. 5 and 6, which illustrate specific example embodiments of a message user interface 250 shown on display screen 22. Generally, in some example embodiments, a potential security rule may be automatically or dynamically recognized and generated by the security module 109 (as opposed to than being manually configured in an options menu, i.e., options menu 200 in FIG. 4). Referring to FIG. 5, the message user interface 250 may be used to access messages 252 contained in an "inbox" of a user, for example email messages stored as message information 114 in memory 24 (FIG. 3), or accessible from a remote server in wireless network 50 (FIG. 1). In the example embodiment shown, there are five stored or accessible messages 252a to 252e on message user interface 250. Also shown is a cursor 254 which may be used to indicate which message is presently selected. The cursor 254 may be used for scrolling between messages 252 (i.e., using thumbwheel 28a), for subsequent selection and viewing of a desired message 252. As best illustrated in FIG. 6, the message user interface 250 may contain keyboard shortcuts. If a user enters a "t" key in keyboard 32, the cursor 254 may be moved to the top of the message user interface 250. In the example shown, the top of the message user interface 250 is message 252a from John Smith. Having the cursor 254 at the top message of the message user interface 250 may be considered a particular device state. Thus, the "t" key may be considered a keyboard shortcut to realize this device state, rather than scrolling to the top of the message user interface 250, for example using thumbwheel 28a.

Referring again to FIG. 6, a new security rule may be dynamically generated by the security module 109. A security option popup window 260 may be displayed on top of the message user interface 250 based on the shortcut used by the user. The popup window 260 gives a user the option to create a new security rule based on the shortcut used. In some example embodiments, the popup window 260 may appear based on the first time a user performs a user input shortcut on the device rather than the alternative user input. In other example embodiments, the popup window 260 would appear based on the usage habits of the user. For example, if the user has used the input shortcut a specific number of times (e.g., 10 times) rather than the alternative input, then the popup window 260 would appear on the screen 22.

In some example embodiments, as illustrated in FIG. 6, the popup window 260 is generated based on the specific input shortcut or application. As shown, the popup window 260 states that the user has used the shortcut key "t", rather than scrolling to the top of the message user interface 250. The user is given the option to create a new security rule that would perform a security function based on a breach of this rule, for example the security function may lock the device 10. The user may select icons "ok" 262 or "cancel" 264, depending on the user preference. Also shown is a checkbox 266 for giving the user the option to not show the popup window 260 again. In some example embodiments, the default option is the selectable icon "cancel" 264, to prevent security rules from being accidentally created by the user. If the user selects icon "ok" 262, a new security rule is generated in security rules 116 in memory 24. The new security rule may be stored in a format similar to the memory format shown in FIG. 9. Upon subsequent user operation in the message user interface 250, if a user scrolls to the top of the inbox rather than performing the keyboard shortcut of entering the "t" key in keyboard 32, this would be a breach of the security rule, resulting in the device 10 being locked. The device 10 would have to be unlocked for subsequent operation of the device 10, for example by entering a password or other user identifier.

The operation of the activated security rule will now be explained, with reference to FIG. 5. In some circumstances, an unauthorized user may gain access to the device 10 without knowledge of the authorized user. The message user interface 250 would appear to the unauthorized user to be a conventional message user screen. As indicated, the cursor 254 may be selecting a particular message, for example message 252c. Should the unauthorized user scroll to the top of the interface 250 using thumbwheel 28a or other means other than the keyboard shortcut "t", the detection module 110 (FIG. 3) will determine that the rule has been breached, and the security function module 112 (FIG. 3) will activate the appropriate security function. In the above example, the security function would be to lock the device 10 to prevent further usage of the device 10.

On the other hand, an authorized user of the device 10 would have selected this security rule because the user would often or always use the keyboard shortcut "t", based on the user's individual habits, rather than scroll to the top of the interface 250. Accordingly, this keyboard input would comply with the security rule, and no security function would be activated.

The options user-interface screen 200 will now be explained in greater detail with reference to FIG. 4. The options user-interface screen 200 includes a Create Rule menu 204 and an Edit Security Rules menu 206. The Edit Security Rules menu 206 includes an editor for a number of security rules 214, an application and shortcut dropdown menu 216, and a breach of rule response dropdown menu 218. By way of example only, the application and shortcut dropdown menu 216 includes the selectable options of address book (A) 220*a*, web browser (B) 220*b*, compose message (C) 220*c*, message inbox (M) 220*d* and options menu (O) 220*e*. Each application is associated with a respective keyboard shortcut, as indicated. Thus, using address book (A) 220*a* as an example, if a user inputs "A" into the keyboard 32, this may execute the particular application, in this instance the address book application. As shown, each application 220 is also associated with a respective security function 222. In some example embodiments, the default security function for each and every application and shortcut 220 would be no response 222*a*. Accordingly, using the Edit Security Rules menu 206, a user or system administrator may readily configure the security rules based on a user's individual preference.

In the example embodiment shown, without intending to be limiting, typical security functions 222 for breach of the respective rule are no response 222*a*, lock application 222*b*, lock device 222*c*, delete personal information 222*d*, and enter honeypot mode 222*e*. No response 222*a* means that the device 10 does not perform any security function in response to a breach of a security rule. In other words, it is as if no security rule exists for that particular function. The lock application 222*b* function terminates the present application in which the particular rule has been breached, and does not permit that particular application to be run by the device 10, until the particular application is unlocked by the user. However, other device functions will still operate within the device 10. The lock device 222*c* function does not allow the device 10 to run any applications or to accept any user inputs from user input 28. The device 10 would have to be unlocked for subsequent operation of the device 10, for example by entering a password or other user identifier. Delete personal information 222*d* will remove from memory 24 any user specific information, for example personal or confidential information. This may also assist those individuals who for example backup their information on separate desktop computer on a regular basis, and would not risk permanently losing such information. A honeypot 222*e* function includes a form of security trap configured to deflect or in some manner counteract attempts at unauthorized use of the information contained in the device. The honeypot causes the device to appear to be functioning normally and/or be part of a larger network, but which is actually isolated and protected, and which seems to contain information or a resource that would be of value.

Although not illustrated in FIG. 4, the device 10 may offer other security functions 222. For example, one possible security function 222 is a "log action" function which would log all device operations and user inputs. The logging of device activity may be stored in memory on the device 10 or transmitted to a remote location for storage and analysis. This may assist in identifying or entrapping the unauthorized user and may be a part of, or combined with, the honeypot mode 222*e* function.

Another possible security function 222 is a "duress password" function coupled with a "lock device" function 222*c*. The duress password function requires a user to enter a secondary password different from their primary password. This is intended to address situations in which the unauthorized user may have obtained access to the user's primary password as well as the device 10. In some cases, the unauthorized user may be able to bypass initial security features and unlock the device 10 because the unauthorized user has access to the primary password. In this situation, if the device 10 determines that it may be compromised because of detection of a violated security rule despite the correct input of the primary password, the user may be prompted to prove identity using this more obscure secondary password.

The operation of the above-described user-configured security rule will now be explained, with reference to FIG. 2. For example, referring briefly to FIG. 4, a user may have configured the Edit Security Rules menu 206 to associate select web browser (B) 220*b* with the security function of honeypot mode 222*e*. In other words, the security rule is defined to be the device state of having launched the web browser (B) 220*b* realized by way of the shortcut input "B". Continuing with the example, an unauthorized user may gain access to the device 10, for example by stealing or otherwise accessing the device 10. Referring again to FIG. 2, the main menu on display screen 22 would appear to the unauthorized user to be a conventional main menu. As indicated, the caret 70 may be used to select a particular application. The unauthorized user may scroll to the web browser icon 66 using thumbwheel 28*a* and execute the web browser application, for example by depressing thumbwheel 28*a*, rather than typing into the keyboard 32 the keyboard shortcut "B". The detection module 110 (FIG. 3) determines that the rule has been breached, e.g. that the device state was realized by way of an input other than the shortcut, and the security function module 112 (FIG. 3) activates the appropriate security function. In this example, the security function would be to enter a honeypot mode to create a separate interface that would appear authentic to the unauthorized user. On the other hand, the authorized user of the device 10 would have selected this security rule because the user would often or always use the keyboard shortcut "B" in the main menu shown in FIG. 2, based on the user's individual habits, rather than scroll to and select the web browser icon 66. Accordingly, this keyboard input would comply with the security rule, and no security function would be activated.

Figure 7:
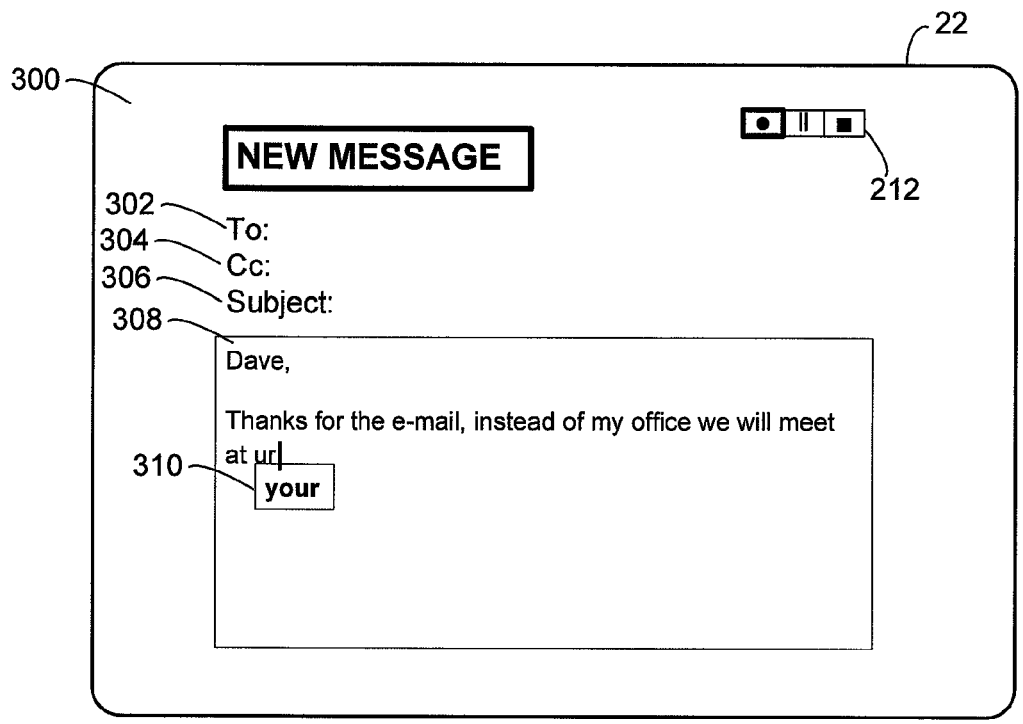
FIG. 7 shows an example of an email-composition user-interface screen shown on a display of the device.
Figure 8:
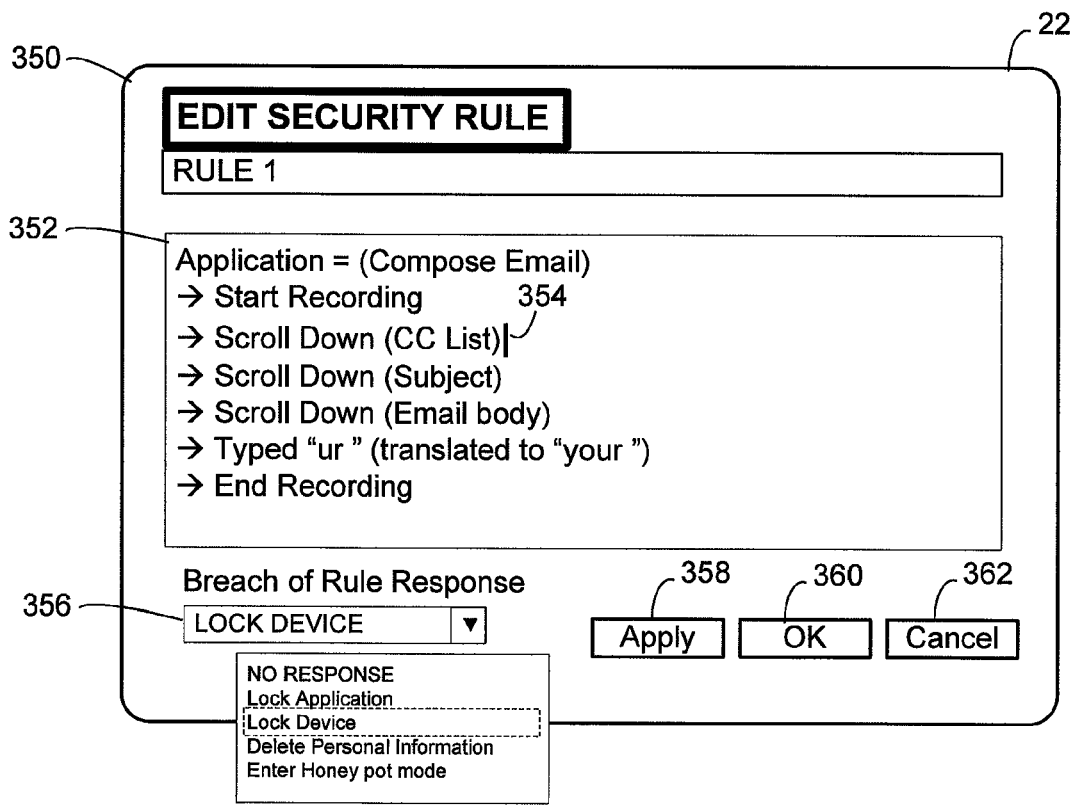
FIG. 8 shows an example of a security-rule-editor user-interface screen on a display of the device.

Referring now to FIG. 4, in some example embodiments, the options user-interface screen 200 may also be used to create and edit a new security rule, which will now be explained with reference to FIGS. 7 and 8. FIG. 7 shows an example of an email-composition user-interface screen 300 shown on the display 22, while FIG. 8 shows an example of a security rule text editor 350. Referring again to FIG. 4, a Create Rule menu 204 includes selectable icons New Rule 208 and Record Rule 210. The Record Rule 210 includes a typical recording bar 212, which as illustrated includes the universal icons for record 212*a*, pause 212*b*, and stop 212*c*. By selecting Record Rule 210, the recording bar 212 may be shown "floating" on the display screen 22, as best illustrated in FIG. 7. A user may then record, pause, and stop the commands or keystrokes used in the particular application. The commands are then recorded in memory, for example flash memory 24. An example of stored commands are shown in text window 352 in FIG. 8, which may be subsequently edited by a user.

The recording feature will be explained in greater detail, referring again to FIG. 7. The email-composition user-interface screen 300 includes a number of fields for input of text by a user. As shown, there is a To field 302, a carbon copy (cc) field 304, a subject field 306, and a message-text field 308. Referring briefly to text window 352 in FIG. 8, a user may perform a number of functions that may be subsequently recorded. For example, referring back to FIG. 7, the cursor may start at the To field 302. Continuing with the example, the user may press the record button 212a. As shown, the record button 212a is selected or darkened to indicate that the user input is being recorded. The user may then scroll down to the Cc field 304. The user may then scroll down to the Subject field 306. The user may then scroll down to the message text field 308. In the message text, the user may type in the text "_ur_" (where "_" is used herein to clearly indicate a space character), which is a pre-existing shortcut on the device 10 (the underscores within the quotes are intended to indicate input of <space> characters). The text "ur" is a shortcut that performs the function of typing in "your", indicated by information box 310 rather than typing in the entire text. The user may then stop recording by pressing the stop recording button 212c. The recorded security rule is then saved in memory 24 as a security rule 116, for example as Security Rule 1 (FIG. 9).

A user may then edit the security rule in the above example by using the text editor 350, referring again to FIG. 8. The security rule text editor 350 for Security Rule 1 may be activated by selecting the appropriate security rule icon 214 (FIG. 4). The text editor 350 includes text window 352 and security function dropdown menu 356. The user may select and manipulate the text contained in text window 352 by positioning a cursor 354. For example, it may be desired to remove all of the text except for the desired shortcut line 'Typed "ur" (translated to "your")'. Security Rule 1 could then be saved or not saved by selecting the commands "Apply" 358, "OK" 360, and/or "Cancel" 362, as appropriate. Security Rule 1 may then be saved as a security rule 116 in flash memory 24, as shown in FIG. 9.

In other example embodiments, referring again to FIG. 8, only the input shortcuts are recorded and displayed in text window 352. In such embodiments, the user may select and manipulate the text contained in text window 352 to configure which input shortcuts are to be detected by the device 10.

The operation of the Security Rule 1 will now be explained, with reference to FIG. 7. For example, an unauthorized user may gain access to the device 10 and wish to send a mass email to all of the contacts contained within address book 102 (FIG. 3), for example sending a virus or mass advertisement. The unauthorized user would compose a message on the email-composition user-interface screen 300, which would appear to be a conventional interface. Should the unauthorized user type into message text field 308 the text "your_" instead of "ur_", the detection module 110 (FIG. 3) will determine that Security Rule 1 has been breached, and the security function module 112 (FIG. 3) will activate the appropriate security function, in this example locking the device 10.

In order to enable detection of the security rule violation, in one embodiment, the device 10 is configured to buffer user inputs for a predetermined period of time. The period of time may vary, but likely reflects a sufficiently long time during which the user may enter a conventional or shortcut input, such as a few seconds. The buffer may be established in RAM 26, flash memory 24, or in another memory element. The buffer may be managed by the operating system 54, the security module 109, and/or the detection module 110.

The device 10, and in particular the detection module 110, may be configured to detect a device state specified by the security rule. For example, the detection module 110 may be configured to detect presence of the word "your_" within the message body of a compose window for generating an email message. The detection module 110 may then read the buffer to determine how the word "your_" came to appear in the compose window. If the buffer contains the sequence of four keystrokes "_", "u", "r", and "_", then it indicates that the user employed the shortcut "ur_" to generate the word "your"; however, if the buffer does not contain this sequence of keystrokes, then the word was input through other means, such as by typing "your". In some cases, the detection module 110 may be configured to detect breach of the security rule by detecting the absence of the input "_ur_" in the buffer. In other cases, the detection module 110 may be configured to detect breach of the security rule by detecting the presence of the conventional input "_your_" in the buffer. The latter approach would avoid breach of the security rule when text containing "_your_" is cut and pasted into the message body. In yet another embodiment, the cutting and pasting of text may be detected within the buffer by the detecting module 110 if it is intended for this to be a permitted operation that does not breach the security rule.

In another example embodiment, the buffer stores input from other user input devices in additional to keystrokes. For example, the buffer may store scrollwheel or trackball inputs. If a security rule exists regarding the use of the shortcut letter "t" to navigate to the top of an email inbox, then on determining that the focus or caret is at the top of the email inbox the detection module 110 may scan the buffer to assess whether the security rule has been violated in arriving at this device state. In this case, the detection module 110 may first determine whether the focus or caret was previously on another message within the inbox. If not, then it may indicate that the inbox was just opened and the focus or caret was placed at the top message as a default so no violation of the security rule took place. If the focus was previously on another message in the list of message, then the detection module 110 may scan the buffer to determine if the most recent keystroke was the shortcut letter "t". If so, then the rule was not violated; however, if not the detection module 110 may further analyze the buffered scroll actions to assess how the focus came to be on the top message. The security rule may impose a default number of messages over which the user must have scrolled to trigger the violation for not using the shortcut, such as for example 10 messages. If the net upwards scrolling, taking into account the recent upwards and downwards scrolling, exceeds ten messages, then the detection module 110 may consider the security rule violated.

The use of temporary input buffers to store recent keystrokes will be well understood by those of ordinary skill in the art as they are commonly used for the purposes of predictive text algorithms and for other functions.

Those skilled in the art will also appreciate that a variety of analyses may be performed upon the buffered input and various suitable conditions may be imposed for determining whether the buffered input reflect conformance with a shortcut based security rule or violation of the security rule by use of a conventional input. The suitable programming of the detection module 110 to perform such analysis and evaluate such conditions will be within the understanding of those skilled in the art.

Referring again to FIG. 4, selection of New Rule 208 menu item permits a user to create a new security rule, again by using the security rule text editor 350 (FIG. 8). In such an instance, text window 352 would be blank and the user would input appropriate text commands, depending on the particular desired commands or applications. The user can also select the appropriate security function to implement by security function dropdown menu 356.

Referring to FIG. 9, as described above, in some example embodiments, the security rule is stored as the input shortcut. For example, security rule is stored as the keyboard shortcut "ur". Any breach of the rule, i.e., any command other than the input shortcut, would activate the security function. Accordingly, in such embodiments the device 10 would detect any user inputs that would breach this security rule. In other words, the security rule is stored as a negative, i.e., will activate the security function in response to any command that is not the "ur" command. However, in other example embodiments, the specific conventional or normal user input is stored as a security rule 116 in memory 24, rather than the input shortcut. For example, referring again to FIG. 9, the security rule 116 would store "your" instead of "ur" (not shown). In such embodiments, the device 10 detects or determines whether the specific conventional or normal user input is input into the device 10, for example detecting the specific user input "your". In other words, the security rule is stored as a positive, i.e., will activate the security function in response to the "your" command only. Following this, the device 10 performs the appropriate security function, as previously explained.

In some example embodiments, referring now to FIGS. 1 and 3, it can be appreciated that the particular system(s) performing the functions of the security module 109, the detection module 110, and/or the security function module 112 may vary depending on the application. With reference to FIG. 1, the security module 109 may be implemented by either the operating system 54 or the particular software application 58. In some example embodiments, the operating system 54 may perform all of the functions of the security module 109. In other example embodiments, for example for the aforementioned Security Rule 1, the detection 110 may be performed by the specific software application 58, for example by messaging module 108. Following detection of a breach of the security rule, the software application 58 may either perform the appropriate security function 112, or communicate the fact of the breach to the operating system 54. In such an instance, the operating system 54 would then perform the appropriate security function 112.

In some example embodiments, in the instance where lock application 222b is performed, this may for example be performed by the specific software application 58 only, without requiring operation from the operating system 54.

It can be appreciated that security functions other than those described above could be implemented by the device 10. In addition, more than one security function (or a combination of security functions 222) could be performed in response to a breach of a security rule.

In some example embodiments, the activation of any security function 222 may also cause the device 10 to alert to another entity, for example a head office, system administrator, or corporate server, that a possible security breach has occurred.

In some example embodiments, the options user-interface screen 200 (FIG. 4) is only accessible by a password-protected interface or by a system administrator.

In the foregoing example embodiments, the user inputs received and analyzed are typically received via the keyboard 32 or scrollwheel 28a. The present application is not restricted to inputs of this nature and may include user inputs, either shortcut inputs or conventional inputs, received via a mouse, trackball, touchscreen (i.e. haptic interface, or any other user input device.

It can also be appreciated that while many of the above example embodiments describe a rule based on a shortcut user input, the opposite could also be implemented, i.e., a breach of a security rule occurs when a shortcut user input is input in the device 10 rather than a conventional user input.

While the invention has been described in detail in the foregoing specification, it will be understood by those skilled in the art that variations may be made without departing from the scope of the invention, being limited only by the appended claims.

What is claimed is:

1. A method of activating security functions on a computer device, the computer device configured for being locked and unlocked, the computer device having a device state that may be realized by way of a first user input or a second user input being received while the computer device is unlocked, the method comprising:
   designating a security function associated with a security rule, the security rule including detecting realization of the device state by way of input other than the first user input and activating the associated security function;
   detecting realization of the device state; and
   activating the associated security function if the device state was realized by way of the second user input instead of the first user input, wherein the first user input comprises a shortcut user input and the second user input comprises a conventional user input, wherein the detecting realization of the device state is performed by a present application program, and wherein the activated associated security function comprises, in response to detecting the conventional user input, a honeypot mode in which an interface is created that appears to be authentic but does not permit unauthorized use of information or a resource on the computer device.

2. The method of claim 1, wherein the second user input is received during operation of the present application program.

3. The method of claim 1, wherein the computer device is a communications device for connection to a communications network.

4. The method of claim 3, further comprising a step of transmitting a message over the communications network to a remote entity that the second user input was input rather than the first user input.

5. The method of claim 1, further comprising a step of temporarily buffering input received via said interface, and wherein said step of activating includes reading said buffered input to detect receipt of said second user input rather than said first user input.

6. The method of claim 5, wherein said step of reading said buffered input is performed in response to detection of realization of the device state.

7. The method of claim 1, wherein the first user input and second user input are inputs received via at least one of a keyboard, touchscreen, keypad, trackwheel, trackball, and mouse.

8. The method of claim 1, further comprising the steps of:
   detecting receipt of the first user input for realizing the device state;
   identifying the second user input as an alternative user input for realizing the device state; and
   generating the security rule, wherein the security rule associates a security violation with receipt of the second user input rather than the first user input for realizing the device state.

9. A computer device, comprising:
a controller for controlling the operation of the device;
a input interface for inputting information to the controller;
a display coupled to the controller for displaying an interface;
a software module executable by the controller and configured to produce a device state that may be realized by way of a first user input or a second user input received while the computer device is unlocked; and
a security module executable by the controller for locking and unlocking of the computer device and configured to:
designate a security function associated with a security rule, the security rule including detecting realization of the device state by way of input other than the first user input and activating the associated security function,
detect realization of the device state, and
activate the associated security function if the device state was realized by way of the second user input instead of the first user input, wherein the first user input comprises a shortcut user input and the second user input comprises a conventional user input, wherein the detection of the device state is performed by a present application program, and wherein the activated associated security function comprises, in response to detecting the conventional user input, a honeypot mode in which the interface is created that appears to be authentic but does not permit unauthorized use of information or a resource on the computer device.

10. The device of claim 9, further including a memory and wherein said security module is configured to temporarily buffer input received via said interface, and wherein said security module is configured to read said buffered input to detect receipt of said second user input rather than said first user input.

11. The device of claim 10, wherein said security module is further configured to read said buffered input based on a determination that said device state has been realized.

12. The device of claim 9, wherein the present application program is configured to designate the security function and determine whether the device state was realized by way of the first user input or the second user input.

13. The device of claim 9, wherein the computer device is a communications device for connection to a network.

14. The device of claim 9, wherein the interface includes a configurable options interface for selecting any one of the first user input, the security function, and the device function.

15. The device of claim 9, wherein the interface comprises at least one of a keyboard, touchscreen, keypad, trackwheel, trackball, and mouse.

16. The device of claim 9, wherein said security module further comprises a detection component configured to generate the security rule and which is configured to detect receipt of the first user input for realizing the device state, identify the second user input as an alternative user input for realizing the device state, and generate the security rule, wherein the security rule associates a security violation with receipt of the second user input rather than the first user input for realizing the device state.

17. A computer program product having a machine-readable non-transitory storage medium having encoded thereon computer-executable instructions for activating security functions on a computer device, the computer device configured for being locked and unlocked, the computer device having a device state that may be realized by way of a first user input or a second user input being received while the computer device is unlocked, the computer-executable instructions comprising:
instructions for designating a security function associated with a security rule, the security rule including realization of the device state by way of input other than the first user input and activating the associated security function;
instructions for detecting realization of the device state; and
instructions for activating the associated security function if the device state was realized by way of the second user input instead of the first user input, wherein the first user input comprises a shortcut user input and the second user input comprises a conventional user input, wherein the detecting realization of the device state is performed by a present application program, and wherein the activated associated security function comprises, in response to detecting the conventional user input, a honeypot mode in which an interface is created that appears to be authentic but does not permit unauthorized use of information or a resource on the computer device.

18. The method of claim 1, wherein the present application program comprises a messaging application program.

19. The method of claim 1, wherein the method further comprises locking the present application program.

20. The method of claim 1, wherein the method further comprises logging device operations and user inputs while the honeypot mode is activated.

21. The method of claim 20, wherein the computer device is coupled to a communications network, and wherein the method further comprises transmitting logged device operations and user inputs over the communications network to a remote entity.

22. The device of claim 9, wherein the security module is further configured to lock the present application program.

23. The device of claim 9, wherein the security module is further configured to logging device operations and user inputs while the honeypot mode is activated.

24. The device of claim 23, wherein the computer device coupled to a communications network, and wherein the security module is further configured to transmit logged device operations and user inputs over the communications network to a remote entity.

* * * * *

UNITED STATES PATENT AND TRADEMARK OFFICE
CERTIFICATE OF CORRECTION

PATENT NO. : 8,365,282 B2
APPLICATION NO. : 11/779372
DATED : January 29, 2013
INVENTOR(S) : Daryl Martin et al.

It is certified that error appears in the above-identified patent and that said Letters Patent is hereby corrected as shown below:

In the Claims:

Claim 23, column 16, line 48, "further configured to logging device operations and user" should read --further configured to log device operations and user--

Claim 24, column 16, line 50, "The device of claim 23, wherein the computer device" should read --The device of claim 23, wherein the computer device is--

Signed and Sealed this
Seventh Day of May, 2013

Teresa Stanek Rea
*Acting Director of the United States Patent and Trademark Office*